(12) United States Patent
Zhou et al.

(10) Patent No.: US 12,015,688 B1
(45) Date of Patent: Jun. 18, 2024

(54) FAST-LOCKING PHASE-LOCKED LOOP, TRANSCEIVER, AND COMMUNICATION DEVICE

(71) Applicant: Hangzhou Geo-chip Technology Co., Ltd., Hangzhou (CN)

(72) Inventors: Yanping Zhou, Hangzhou (CN); Chun Geik Tan, San Diego, CA (US); Sy-Chyuan Hwu, Hangzhou (CN)

(73) Assignee: Hangzhou Geo-chip Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/538,841

(22) Filed: Dec. 13, 2023

(30) Foreign Application Priority Data

Jan. 3, 2023 (CN) .......................... 202310000705.2

(51) Int. Cl.
*H04L 7/033* (2006.01)
(52) U.S. Cl.
CPC .................................. *H04L 7/033* (2013.01)
(58) Field of Classification Search
CPC ........................................................ H04L 7/033
See application file for complete search history.

(56) References Cited

U.S. PATENT DOCUMENTS

| | | | | |
|---|---|---|---|---|
| 9,240,794 | B2* | 1/2016 | Reichelt | H03L 7/099 |
| 10,483,963 | B2* | 11/2019 | Wu | H03K 17/22 |
| 10,873,335 | B2* | 12/2020 | Marcu | H03L 7/18 |
| 2015/0222275 | A1 | 8/2015 | Reichelt et al. | |

FOREIGN PATENT DOCUMENTS

| | | |
|---|---|---|
| CN | 101101309 A | 1/2008 |
| CN | 102291125 | 12/2011 |
| CN | 102857218 A | 1/2013 |
| CN | 103297042 A | 9/2013 |
| CN | 103346790 | 10/2013 |

(Continued)

OTHER PUBLICATIONS

D. Liao et al., "An mm-Wave Synthesizer With Robust Locking Reference-Sampling PLL and Wide-Range Injection-Locked VCO", IEEE Journal of Solid-State Circuits, vol. 55, No. 3, Mar. 2020, pp. 536-546.

(Continued)

*Primary Examiner* — Vineeta S Panwalkar
(74) *Attorney, Agent, or Firm* — Nixon & Vanderhye P.C.

(57) ABSTRACT

A fast-locking phase-locked loop comprises a phase frequency detector, a charge pump, a loop filter, a voltage-controlled oscillator, a frequency divider, and a fast-locking control unit which receives a reference clock signal at its first input terminal and a phase-locking enable signal at its second input terminal and outputs a reset signal at a high level in response to a rising edge of the reference clock signal when receiving the phase-locking enable signal, wherein the frequency divider is connected to an output terminal of the fast-locking control unit and configured to trigger generation of a feedback signal in response to the reset signal at the high level, and the phase frequency detector is connected to the output terminal of the fast-locking control unit and configured to output a phase error between the reference clock signal and the feedback signal in response to the reset signal at the high level.

9 Claims, 3 Drawing Sheets

(56) References Cited

FOREIGN PATENT DOCUMENTS

CN    111953339    11/2020
CN    113014254    6/2021

OTHER PUBLICATIONS

Jiang Ping et al., "Design of phase frequency detector with a novel delay unit", Application of Electronic Technique, vol. 44, No. 4, 2018, 5 pages, English abstract provided.
Notification of the First Office Action mailed May 6, 2023 in Chinese Application No. 202310000705.2, with English translation, 20 pages.
Notice of Granting Invention Patent mailed Aug. 14, 2023 in Chinese Application No. 202310000705.2, with English translation, 6 pages.

\* cited by examiner

FAST-LOCKING PHASE-LOCKED LOOP, TRANSCEIVER, AND COMMUNICATION DEVICE

CROSS-REFERENCE TO RELATED PATENT APPLICATION

This application claims the benefit of and priority to Chinese Patent Application No. 202310000705.2 filed on Jan. 3, 2023, the entire disclosure of which is incorporated by reference herein.

TECHNICAL FIELD

The present disclosure relates to the field of radio frequency transceivers, in particular to a phase-locked loop, a transceiver and a communication device which enable fast locking.

BACKGROUND

This section is intended to provide background or context to embodiments of the present disclosure as set forth in claims. What is described herein is not admitted to be prior art merely by virtue of its inclusion in this section.

Due to the increasingly decreased semiconductor process size and increased system complexity, the operating frequency of a transceiver chip has been continuously increased, which leads to higher requirements on the frequency and quality of a clock of the transceiver for ensuring stable operations of the chip. A phase-locked loop (PLL) has been widely used in various transceivers as a clock source for a System-on-Chip (SoC).

Fast locking has always been a goal of research and development for phase-locked loops. However, due to mutual constraints between factors such as stability, dynamic response, accuracy, and noise, it is difficult to further improve the phase-locking speed. The existing solutions for accelerating the phase locking include changing the current in the charge pump, but this solution involves a rather complex circuit structure, which likely not only causes noise in the phase-locked loop system, but also changes the parameters of the phase-locked loop, thus making it difficult to widely apply this solution to various phase-locked loop systems.

Thus, it is needed to solve the problem of accelerating the phase locking.

SUMMARY

In view of the problem of long phase-locking time in the prior art, a phase-locked loop, a transceiver and a communication device which enable fast locking are proposed to accelerate the phase locking therein.

The present disclosure provides following solutions.

In a first aspect, a fast-locking phase-locked loop is provided. The phase-locked loop includes a phase frequency detector, a charge pump, a loop filter, a voltage-controlled oscillator, and a frequency divider, and further includes a fast-locking control unit that has a first input terminal for receiving a reference clock signal and a second input terminal for receiving a phase-locking enable signal and is configured to output a reset signal at a high level in response to a rising edge of the reference clock signal when receiving the phase-locking enable signal, where the frequency divider is connected to an output terminal of the fast-locking control unit and configured to trigger generation of a feedback signal in response to the reset signal at the high level, and the phase frequency detector is connected to the output terminal of the fast-locking control unit and configured to output a phase error between the reference clock signal and the feedback signal in response to the reset signal at the high level.

In an embodiment, the fast-locking control unit is configured to output the reset signal at a low level when the phase-locking enable signal is at a low level, and shift the reset signal from the low level to the high level at the rising edge of the reference clock signal when the phase-locking enable signal is at a high level.

In an embodiment, the fast-locking control unit includes a rising edge triggered D-type flip-flop (DFF).

In an embodiment, the D-type flip-flop has a D terminal for receiving the phase-locking enable signal, a CLK terminal for receiving the reference clock signal, a reset terminal for receiving the phase-locking enable signal, and a Q terminal functioning as an output terminal.

In an embodiment, the fast-locking control unit includes a plurality of cascaded D-type flip-flops.

In an embodiment, the fast-locking control unit includes two cascaded D-type flip-flops, such that the fast-locking control unit outputs the reset signal at the high level at the second rising edge of the reference clock signal.

In an embodiment, the phase frequency detector is configured to reset the output phase error signals UP and DN to 0 in response to the reset signal at the low level.

In an embodiment, the frequency divider is configured to reset the feedback signal to a low level in response to the reset signal at the low level, and output the feedback signal based on a period $T_{VCO}$ of an output signal $F_{VCO}$ of the voltage-controlled oscillator and the number N of voltage dividers in response to the reset signal at the high level.

In a second aspect, a fast-locking transceiver is provided, which includes the phase-locked loop according to the first aspect.

In a third aspect, a fast-locking communication device is provided, which includes the phase-locked loop according to the first aspect.

One of advantages of the embodiment lies in that, with the use of the provided fast phase-locking control circuit, an initial phase error between the reference clock signal and the feedback signal can be reduced, thereby achieving the fast phase locking.

Other advantages of the present disclosure will be explained in more details with reference to the following description and accompanying drawings.

It should be noted that the aforesaid description is just a summary of the technical solutions of the present disclosure. In order to facilitate a better understanding of technical means of the present disclosure so that the present disclosure could be implemented in accordance with the description in the specification, and to render the above and other objects, features, and advantages of the present disclosure more clear. The specific embodiments of the present disclosure are given below.

BRIEF DESCRIPTION OF THE DRAWINGS

By reading following the detailed description of the exemplary embodiments below, a person of ordinary skill in the art may understand the advantages and benefits described herein and other advantages and benefits. The accompanying drawings are only for the purpose of illustrating exemplary embodiments and are not intended to be a limitation of the present disclosure. Further, the same reference character is used to designate the same element throughout the accompanying drawings, in which.

In the accompanying drawings, the same or corresponding reference characters designate the same or corresponding parts.

DETAILED DESCRIPTION

Exemplary embodiments of the present disclosure will be described below in more details with reference to the accompanying drawings. Although the accompanying drawings illustrate exemplary embodiments of the present disclosure, it should be understood that the present disclosure can be implemented in various ways and should not be construed to be limited to embodiments described herein. Rather, these embodiments are provided to facilitate more thorough understanding of the present disclosure so that the scope of the present disclosure could be fully conveyed to those skilled in the art.

In description of embodiments of the present disclosure, it should be understood that terms such as "include" or "have" are intended to indicate the existence of the characters, digits, steps, actions, components, parts disclosed by the specification or any combination thereof, without excluding the existence of one or more other characters, digits, steps, actions, components, parts or any combination thereof.

Unless otherwise specified, "I" refers to "or". For example, A/B may indicate A or B. In this specification, the term "and/or" merely describes the association relationship between the associated objects and indicates that there may be three relationships. For example, A and/or B may indicate three cases where only A exists, both A and B exist, and only B exists.

In addition, the terms such as "first" and "second" are merely for a descriptive purpose, and cannot be understood as indicating or implying a relative importance, or implicitly indicating the number of the indicated technical features. Hence, the features defined by "first" and "second" can explicitly or implicitly include one or more features. In the description of embodiments of the present disclosure, "a plurality of" means two or more in number, unless otherwise stated.

Figure 1:
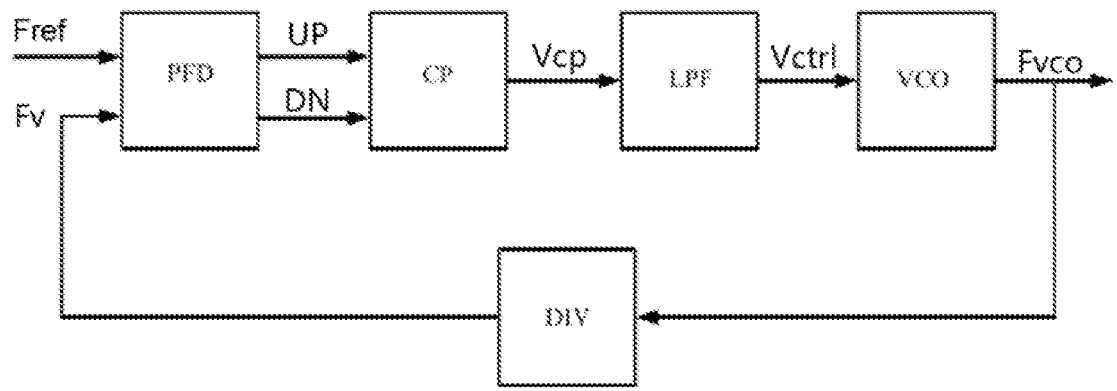
FIG. 1 is a schematic structural diagram of a conventional charge pump phase-locked loop.

As shown in FIG. 1, especially in zero IF transceivers, the conventional charge pump phase-locked loop generally includes a phase-frequency detector (PFD), a charge pump (CP), a loop filter (LPF), a voltage-controlled oscillator (VCO), and a frequency divider (DIV). The phase-frequency detector PFD converts the phase and frequency differences between a reference clock signal Fref and a feedback signal Fv into a phase detection error, which is used in the charge pump CP to control the on-off of the charge pump, thereby charging or discharging the loop filter LPF and hence changing the control voltage of the voltage-controlled oscillator VCO. The control voltage of the voltage-controlled oscillator VCO is proportional to the phase detection error, and due to the effect of the negative feedback loop, the frequency or phase of the feedback signal Fv tends to be changed in such a way that the phase detection error is decreased till to zero. When the phase detection error becomes zero, the phase-locked loop is in a locked state.

When the phase-locked loop is closed, the phase-frequency detector PFD actually needs to compare the reference clock signal Fref and the feedback signal Fv to detect the phase error and frequency error therebetween. At this point, if the initial phase error between the reference clock signal Fref and the feedback signal Fv is relatively large, the output control voltage Vctrl from the voltage-controlled oscillator VCO is subjected to a significant change to compensate for the initial phase error, which results in long locking time for the phase-locked loop.

Figure 2A:
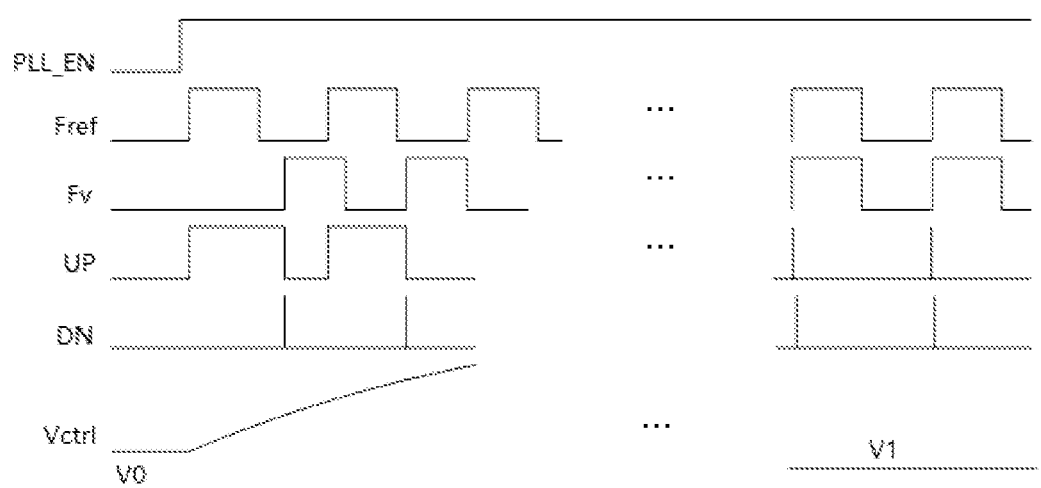
FIG. 2*a* is a schematic timing diagram of phase locking in the charge pump phase-locked loop shown in FIG. 1.
Figure 2B:
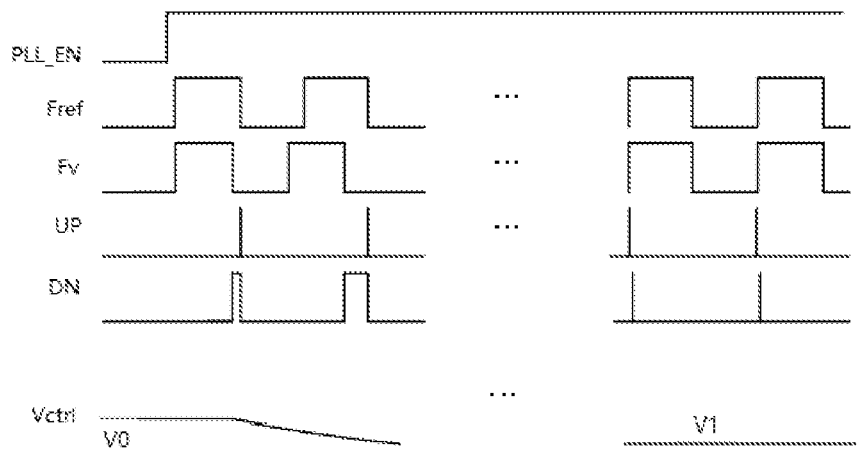
FIG. 2*b* is another schematic timing diagram of phase locking in the charge pump phase-locked loop shown in FIG. 1.

FIGS. 2*a* and 2*b* show the difference in phase-locking time for the phase-locked loop under different initial phase errors between the reference clock signal Fref and the feedback signal Fv. The frequency divider DIV generates a feedback signal Fv from the frequency of the output signal $F_{VCO}$ of the voltage-controlled oscillator VCO. As shown, the control voltage Vctrl of the voltage-controlled oscillator VCO has an initial value of V0 and the frequency of the feedback signal Fv is greater than the frequency of the reference clock signal Fref. In order for the locked state of the phase-locked loop, the control voltage Vctrl of the voltage-controlled oscillator VCO need be reduced to a locking voltage V1 such that the frequency of the feedback signal Fv is equal to the frequency of the reference clock signal Fref. As shown in FIG. 2*a*, the initial phase error between the reference clock signal Fref and the feedback signal Fv is relatively large, thus the control voltage Vctrl increases and then decreases to the locking voltage V1, and as shown in FIG. 2*b*, the initial phase error between the reference clock signal Fref and the feedback signal Fv is relatively small, thus the control voltage Vctrl just needs to be changed to compensate for the frequency error, so that the locking time is shortened.

In view of the technical problem of a rather long time required for phase locking due to a relatively great initial phase error between the reference clock signal Fref and the feedback signal Fv, an object of embodiments of the present disclosure is to provide a fast-locking phase-locked loop, which can decrease the initial phase error between the reference clock signal Fref and the feedback signal Fv to avoid the long time of compensating for the initial phase error in the phase-locked loop, thus time is spent only in reducing the frequency error between the reference clock signal Fref and the feedback signal Fv.

Figure 3:
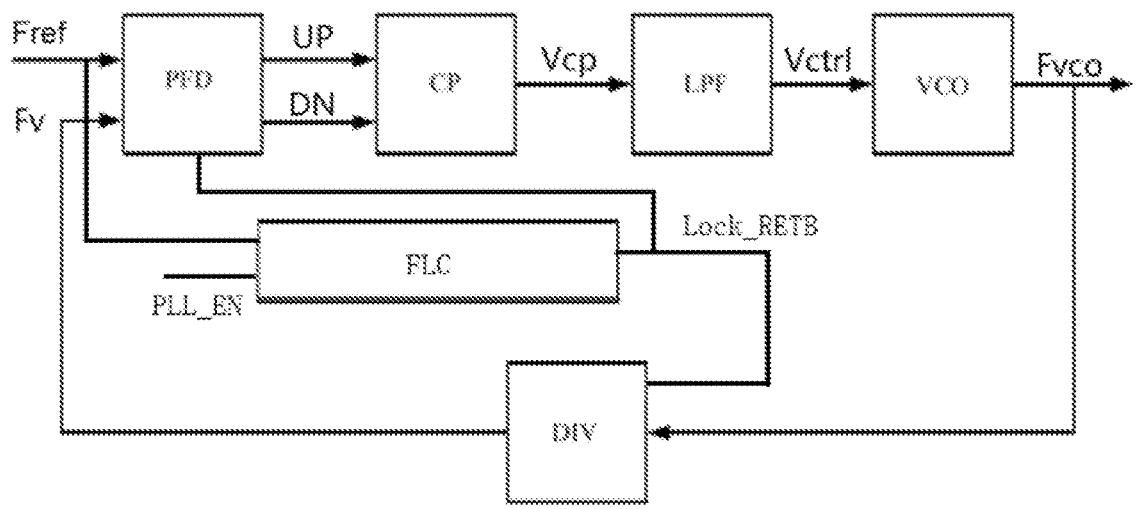
FIG. 3 is a schematic structural diagram of a fast-locking phase-locked loop according to an embodiment of the present disclosure.

A fast-locking phase-locked loop according to an embodiment of the present disclosure as shown in FIG. 3 includes a fast-locking control unit FLC in addition to the phase-frequency detector, the charge pump, the loop filter, the voltage-controlled oscillator, and the frequency divider as described above.

The fast-locking control unit FLC has a first input terminal for receiving a reference clock signal Fref, a second input terminal for receiving a phase-locking enable signal PLL_EN, and an output terminal which is connected to both a frequency phase-frequency detector PFD and the frequency divider DIV and is configured to output a reset signal Lock_RSTB.

In this embodiment, in order to decrease the initial phase error between the reference clock signal Fref and the feedback signal Fv, the fast-locking control unit FLC is configured to generate, when receiving the phase-locking enable signal PLL_EN that is at a high level (i.e., PLL_EN=1), the reset signal Lock_RSTB at a high level (i.e., Lock_RSTB=1) in response to the rising edge of the reference clock signal Fref and to transmit the generated reset signal to the phase-frequency detector PFD and the frequency divider DIV.

Specifically, the fast-locking control unit FLC is configured to output the reset signal Lock_RSTB at a low level (i.e., Lock_RSTB=0) when the phase-locking enable signal PLL_EN is 0, that is, when the phase-locking enable signal PLL_EN is at a low level, and to shift the reset signal Lock_RSTB from 0 to 1 at the rising edge of the reference clock signal when the phase-locking enable signal PLL_EN is 1, that is, when the phase-locking enable signal PLL_EN is at the high level.

Figure 4:
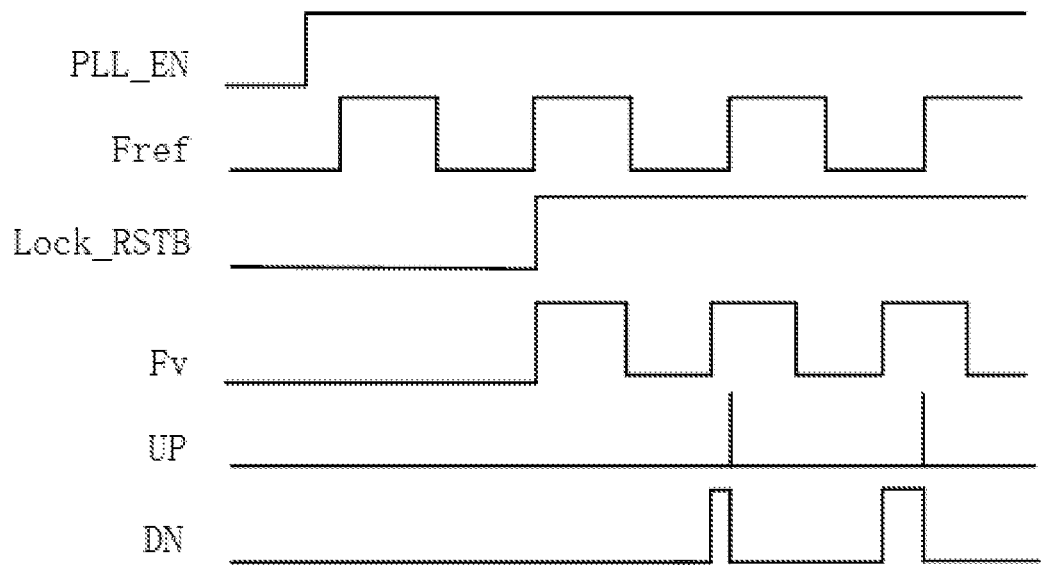
FIG. 4 is a schematic timing diagram of phase locking in the phase-locked loop shown in FIG. 3.

For example, as shown in FIG. 4, when the phase-lock enable signal PLL_EN is at the low level 0, the reset signal Lock_RSTB outputted from the fast-locking control unit FLC is at the low level 0 and functions as a low-level reset signal; and when the phase-locking enable signal PLL_EN is at the high level 1, the reset signal Lock_RSTB is shifted from the low level 0 to the high level 1 at the rising edge of the reference clock signal Fref. It could be understood that the reset signal Lock_RSTB always remains at the high level unless the phase-lock enable signal PLL_EN is reset to the low level 0.

The frequency divider DIV is connected to the output terminal of the fast-locking control unit FLC and receives the reset signal Lock_RSTB output by the fast-locking control unit FLC in real time. The frequency divider DIV triggers the generation of the feedback signal Fv in response to the reset signal at the high level output from the fast-locking control unit FLC.

Specifically, the frequency divider DIV is configured to reset, when the reset signal Lock_RSTB is 0 (that is, when the fast-locking control unit FLC outputs a low-level reset signal), the feedback signal Fv to a low level (i.e., Fv=0) in response to the low-level reset signal, and to output, when the reset signal Lock_RSTB is 1 (that is, when the fast-locking control unit FLC outputs a high-level reset signal), the feedback signal Fv at a high level (i.e., Fv=1) in response to the high-level reset signal. Further, in order to ensure that the output pulse of the feedback signal Fv is correct, the feedback signal Fv may be output based on the period $T_{VCO}$ of the output signal $F_{VCO}$ of the voltage controlled oscillator VCO and the number N of the voltage dividers.

For example, as shown in FIG. 4, the frequency divider DIV resets the outputted feedback signal Fv to 0 when receiving the reset signal Lock_RSTB at 0. In the case of the received reset signal Lock_RSTB=1, i.e., at the rising edge of the reference clock signal Fref, the frequency divider DIV outputs the feedback signal Fv=1 and subsequently maintains the pulse period of the feedback signal Fv based on the period $T_{VCO}$ of the output signal from the voltage controlled oscillator VCO and the number N of the voltage dividers, such that the pulse period of the feedback signal Fv is N times of $T_{VCO}$.

The phase-frequency detector PFD is connected to the output terminal of the fast-locking control unit FLC to receive in real time the reset signal Lock_RSTB output from the fast-locking control unit FLC, and outputs phase error signals UP and DN between the reference clock signal Fref and the feedback signal Fv in response to the reset signal Lock_RSTB at the high level of 1.

Specifically, the phase-frequency detector PFD may be configured to reset the output phase error signals UP and DN to 0 when the reset signal Lock_RSTB is 0, that is, when the fast-locking control unit FLC outputs the low-level reset signal, and to initiate comparison of the reference clock signal Fref and the feedback signal Fv to detect the phase error therebetween and output the phase error signals UP and DN when the reset signal Lock_RSTB is 1, that is, when the fast-locking control unit FLC outputs the high-level reset signal.

For example, with reference to the timing diagrams of the signals Lock_RSTB, Fref, Fv and UP, DN in FIG. 4, it can be seen that the phase error signals UP and DN are always maintained at 0 when the reset signal Lock_RSTB is 0, and when the reset signal Lock_RSTB is 1, phases of the reference clock signal Fref and the feedback signal Fv are compared to detect the phase error therebetween, and the phase error signals UP and DN are output.

Thus, at this point, the initial rising edge of the feedback signal Fv is shifted to almost align with one of the rising edges of the reference clock signal Fref, so that the initial phase error between the reference clock signal Fred and the feedback signal Fv is greatly reduced. Therefore, the phase error signals UP and DN contain small phase errors and reflect mainly the frequency error between the reference clock signal Fref and the feedback signal Fv.

In an embodiment, the fast-locking control unit FLC may include a rising edge triggered D-type flip-flop.

Specifically, the D-type flip-flop may have a D terminal for receiving the phase-locking enable signal, a CLK terminal for receiving the reference clock signal, a reset terminal RSTB for receiving the phase-locking enable signal, and a Q terminal functioning as an output terminal. When the phase-locking enable signal PLL_EN is 0, that is, the reset terminal RSTB is at a low level of 0, the output from the output terminal Q is always 0. When the phase-locking enable signal PLL_EN is at a high level of 1, that is, both the D terminal and the reset terminal RSTB are at the high level of 1, the level value at the D terminal is assigned to the output terminal Q at a rising edge of the signal inputted to the CLK terminal, thus the output terminal Q is at the high level of 1. For any non-rising edge of the signal inputted to the CLK terminal, the output terminal Q is at a constant level.

In an embodiment, the fast-locking control unit may include a plurality of cascaded D-type flip-flops.

Figure 5:
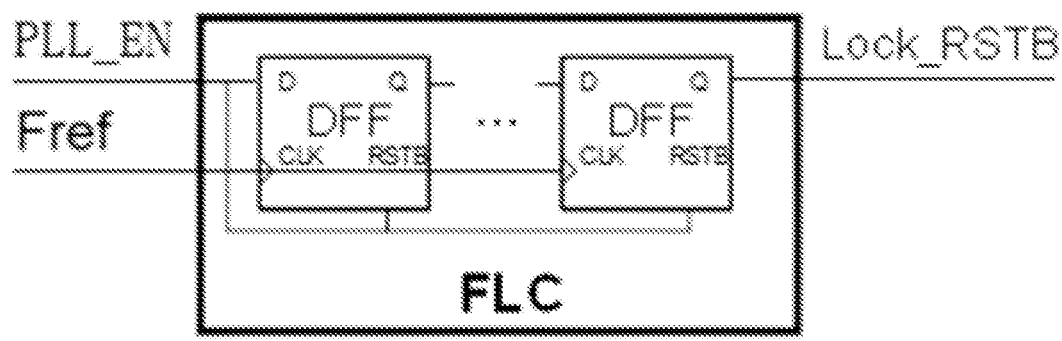
FIG. 5 is a schematic structural diagram of a fast-locking control module according to an embodiment of the present disclosure.

Specifically, as shown in FIG. 5, there may be provided two cascaded D-type flip-flops, where the output terminal Q of the front-stage D-type flip-flops may be connected to the D terminal of the rear-stage D-type flip-flops, such that the fast-locking control unit FLC outputs the reset signal Lock_RSTB at the high level of 1 at the second rising edge of the reference clock signal Fref.

FIG. 4 shows a timing diagram implemented by the fast-locking control unit FLC consisting of the aforesaid two rising edge triggered D-type flip-flops that are cascaded. However, it should be understood that in alternative embodiments, three or more cascaded D-type flip-flops may also be employed for the fast-locking control unit FLC, and the corresponding timing diagrams thereof may be somewhat slightly different. For example, the reset signal Lock_RSTB at the high level of 1 may be output at other rising edges of the Fref in some embodiments, which is not specifically limited in the present disclosure. One of advantages of the embodiment lies in that an initial phase error between the reference clock signal and the feedback signal can be reduced by the fast phase-locking control circuit, such that the fast phase locking can be achieved.

Based on the same technical concept, embodiments of the present disclosure further provide a fast-locking transceiver, which includes the phase-locked loop according to aforesaid embodiments to achieve the fast phase-locking function.

Based on the same technical concept, embodiments of the present disclosure further provide a fast-locking communication device, which includes the phase-locked loop according to aforesaid embodiments to implement the fast phase-locking function.

Furthermore, it should be noted that the embodiments of the present disclosure and features of the embodiments may be combined with each other in any manner as long as they are not contradictory. In the description of this specification, the description with reference to terms such as "some possible embodiments", "some embodiments", "examples", "specific examples", or "some examples", and the like indicates that the specific feature, structure, material or characteristic described with reference to the embodiment or example is included in at least one embodiment or example of the present disclosure. In this specification, the schematic representations of the aforesaid terms do not necessarily for the same embodiment or example. Moreover, the specific features, structures, materials or characteristics as described may be combined in any one or more embodiments or examples in a suitable manner. In addition, those skilled in the art may combine and group the different embodiments or examples and the features of the different embodiments or examples described in this specification without contradicting each other.

Although the spirit and principles of the present disclosure have been described with reference to several embodiments, it shall be understood that the present disclosure is not limited to the embodiments as disclosed, nor does the division of the aspects imply that the features in those aspects cannot be combined for benefit, such division being for convenience of presentation only. The present disclosure is intended to cover various modifications and equivalent arrangements included within the spirit and scope of the appended claims.

What is claimed is:

1. A fast-locking phase-locked loop, comprising a phase frequency detector, a charge pump, a loop filter, a voltage-controlled oscillator, and a frequency divider, and further comprising:
    a fast-locking control unit that has a first input terminal for receiving a reference clock signal and a second input terminal for receiving a phase-locking enable signal and is configured to shift an outputted reset signal from a low level to a high level in response to a rising edge of the reference clock signal, when the received phase-locking enable signal is at a high level, so as to reduce an initial phase error between the reference clock signal and a feedback signal,
    wherein the frequency divider is connected to an output terminal of the fast-locking control unit and configured to trigger generation of the feedback signal in response to the reset signal at the high level; and
    the phase frequency detector is connected to the output terminal of the fast-locking control unit and configured to output a phase error between the reference clock signal and the feedback signal in response to the reset signal at the high level.

2. The phase-locked loop according to claim 1, wherein the fast-locking control unit is configured to output the reset signal at the low level when the phase-locking enable signal is at a low level; and shift the reset signal from the low level to the high level at the rising edge of the reference clock signal when the phase-locking enable signal is at a high level.

3. The phase-locked loop according to claim 1, wherein the fast-locking control unit comprises a rising edge triggered D-type flip-flop.

4. The phase-locked loop according to claim 3, wherein the D-type flip-flop has a D terminal for receiving the phase-locking enable signal, a CLK terminal for receiving the reference clock signal, a reset terminal for receiving the phase-locking enable signal, and a Q terminal functioning as an output terminal.

5. The phase-locked loop according to claim 1, wherein the fast-locking control unit comprises a plurality of cascaded D-type flip-flops.

6. The phase-locked loop according to claim 5, wherein the fast-locking control unit comprises two cascaded D-type flip-flops, such that the fast-locking control unit outputs the reset signal at the high level at the second rising edge of the reference clock signal.

7. The phase-locked loop according to claim 1, wherein the phase frequency detector is configured to reset phase error signals UP and DN to 0 in response to the reset signal at the low level.

8. The phase-locked loop according to claim 1, wherein the frequency divider is configured to reset the feedback signal to a low level in response to the reset signal at the low level, and output the feedback signal based on a period of an output signal of the voltage-controlled oscillator and the number N of voltage dividers in response to the reset signal at the high level.

9. A fast-locking transceiver, comprising a phase-locked loop according to claim 1.

* * * * *